US012124327B2

(12) United States Patent
Seck et al.

(10) Patent No.: US 12,124,327 B2
(45) Date of Patent: Oct. 22, 2024

(54) INCIDENT RESOLUTION SYSTEM

(71) Applicant: Capital One Services, LLC, McLean, VA (US)

(72) Inventors: Mohamed Seck, McLean, VA (US); Louis Buell, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 262 days.

(21) Appl. No.: 17/670,829

(22) Filed: Feb. 14, 2022

(65) Prior Publication Data

US 2023/0259419 A1 Aug. 17, 2023

(51) Int. Cl.
*G06F 11/00* (2006.01)
*G06F 11/07* (2006.01)
*G06N 5/022* (2023.01)
*G06N 5/04* (2023.01)

(52) U.S. Cl.
CPC ...... *G06F 11/0793* (2013.01); *G06F 11/0709* (2013.01); *G06N 5/022* (2013.01); *G06N 5/04* (2013.01)

(58) Field of Classification Search
CPC ............. G06F 11/0793; G06F 11/0709; G06F 11/3065; G06F 11/2247; G06F 11/2263
See application file for complete search history.

(56) References Cited

U.S. PATENT DOCUMENTS

| | | | |
|---|---|---|---|
| 9,406,023 B2 | 8/2016 | Bogojeska et al. | |
| 10,535,002 B2 | 1/2020 | Gupta et al. | |
| 10,877,946 B1 | 12/2020 | Silva et al. | |
| 10,985,994 B1 | 4/2021 | Mahadik et al. | |
| 11,003,518 B2 | 5/2021 | Lopez et al. | |
| 2007/0067773 A1 | 3/2007 | Hope et al. | |
| 2008/0098109 A1 | 4/2008 | Faihe et al. | |
| 2018/0307756 A1 | 10/2018 | Garay | |

(Continued)

OTHER PUBLICATIONS

International Search Report and the Written Opinion of the International Searching Authority issued in related PCT Application No. PCT/US2023/012990 mailed Apr. 14, 2023, 15 pages.

(Continued)

*Primary Examiner* — Katherine Lin
(74) *Attorney, Agent, or Firm* — HUNTON ANDREWS KURTH LLP

(57) ABSTRACT

An automated system is provided for facilitating resolution of an incident on a digital processing system. The automated system has a data storage unit with information on previous incidents, a user interface and a resolution facilitation server. The server receives incident information from a monitoring system, including status information for at least one operating parameter of the digital processing system. The server is configured to apply a machine learning model to determine a first recommended action using the incident information and the previous incident information, present the first recommended action to the user, and receive a recommendation response. The server is also configured to establish a recommendation score based at least in part on the recommendation response and to update the machine learning model using the incident information, the first action recommendation, and/or the first recommendation score.

18 Claims, 10 Drawing Sheets

(56) References Cited

U.S. PATENT DOCUMENTS

2019/0003929 A1\* 1/2019 Shapiro ................ G05B 23/024
2019/0347282 A1 11/2019 Cai et al.
2020/0293946 A1 9/2020 Sachan et al.
2021/0397497 A1 12/2021 Tiwari et al.

OTHER PUBLICATIONS

Notification Concerning Transmittal of International Preliminary Report on Patentability from related PCT Application No. PCT/US2023/012990, mailed Aug. 20, 2024, 10 pages.

\* cited by examiner

INCIDENT RESOLUTION SYSTEM

RELATED APPLICATIONS

The subject matter of this application is related to that of U.S. application Ser. Nos. 17/670,855, 17/670,876, 17/670,904, and 17/670,919, which are filed concurrently and the complete disclosures of all of which are incorporated herein by reference.

FIELD OF THE INVENTION

This disclosure relates generally to automated system incident resolution and, more particularly, to systems and methods for using a machine learning model to assess proposed resolution actions and to make action recommendations.

BACKGROUND OF THE INVENTION

When an incident occurs in a highly complex enterprise environment technology system, the urgency to resolve the problem may result in many technological and human resources being brought to bear, some of which are duplicative or inappropriate for the problem. Even when the proper resources are involved, there is often difficulty in identifying critical information and assuring that it is distributed where it is needed. Monitoring and managing the efforts of disparate operatives and operations during an incident is extremely difficult and efficiency is often sacrificed for the sake of obtaining a speedy resolution.

SUMMARY OF THE INVENTION

An illustrative aspect of the invention provides an automated system for facilitating resolution of an incident occurring on a digital processing system. The automated system comprises a data storage unit having stored therein a historical database of information on previous incidents, a user interface configured for presenting information to and receiving information from a user and for receiving action information and responses from the user. The system further comprises an automated resolution facilitation server configured to receive incident information from a monitoring system in communication with the digital processing system. The incident information includes status information for at least one operating parameter of the digital processing system. The automated resolution facilitation server is further configured to apply a machine learning model to determine a first recommended action using the incident information and the previous incident information, present the first recommended action to the user via the user interface, and receive a first recommendation response. The automated resolution facilitation server is also configured to establish a first recommendation score based at least in part on the first recommendation response and update the machine learning model using at least one of the set consisting of the incident information the first action recommendation, and the first recommendation score.

Another aspect of the invention provides an automated method of responding to an incident occurring on a digital processing system. The method comprises receiving, by an incident resolution server, incident information for the incident and applying, by the incident resolution server, a machine learning model to determine a recommended action based on the incident information. The method further comprises transmitting the recommended action by the incident resolution server to a user data processing system for display to a user and receiving, by the incident resolution server, a recommendation response from the user data processing system. The method also comprises establishing, by the incident resolution server, a first recommendation score for the recommended action based at least in part on the recommendation response and updating the machine learning model using at least one of the set consisting of the incident information, the recommended action, and the first recommendation score.

Another aspect of the invention provides an automated incident resolution system for facilitating resolution of an incident occurring on an automated processing system. The incident resolution system comprises an automated incident resolution server configured to periodically receive incident information about the incident and to periodically receive action information about actions taken in furtherance of resolving the incident. The incident resolution server is further configured to apply a machine learning model to determine recommended actions using the incident information, previous incident information, and the action information. The incident resolution server is also configured to transmit the recommended actions over a network to a user processing system for display to a user, receive recommendation responses from the user processing system over the network, and update the machine learning model using at least one of the set consisting of the incident information, the action information, the recommend actions, and the recommendation responses.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

In enterprise scale technology systems dealing with vast numbers of data streams, there may be thousands of opportunities for service disruptions every hour. Large investments are made in monitoring systems to assure early detection and automated response for mitigation of problems. Regardless of such efforts, the complexity of such systems guarantees that there will be incidents that cannot be resolved solely by automated systems and the causes of which are not immediately apparent. Such incidents may trigger a response procedure that involves immediate gathering of personnel resources to evaluate and propose solutions to the problem. In many cases, this may involve the establishment of a bridge call or videoconference to which responders may be called to join. Bridge discussions may be recorded to allow for post-incident evaluation of resolution procedure. The resolution effort and the bridge call are typically run by one or more incident managers who are charged with assuring the right personnel are involved and with action assignment and evaluation.

Incident managers are highly dependent on the information and recommendations provided by personnel on the call. Because there may literally be hundreds of team members on the call, however, it may be extremely difficult to assure that the best action proposals are being heard. There may be too much or too little information and there may be conflicting information and proposals from different organizations. The result may be a tendency to throw many potential solutions at the problem simultaneously, with many different team members taking actions independently and without cross-pollination of information.

Embodiments of the present invention provide an incident resolution system that helps incident managers make decisions on critical actions to be taken in furtherance of resolution. This is accomplished by leveraging historical information on previous incidents through the use of machine learning. The system also helps managers control information and make more efficient use of human and technology resources.

Figure 1:
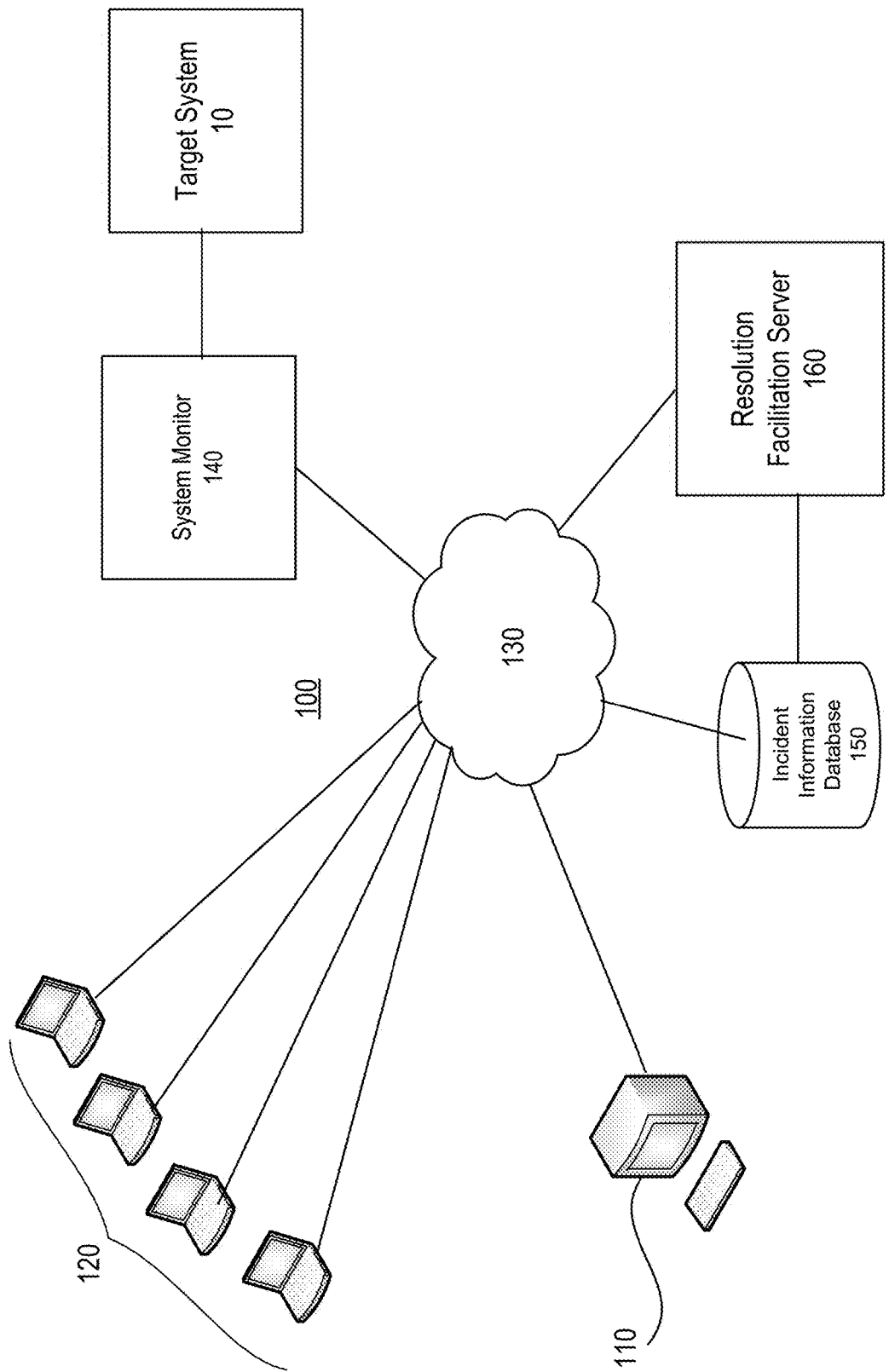
FIG. 1 is a schematic representation of an incident resolution system according to an embodiment of the invention.

With reference to FIG. 1, an incident resolution system 100 according to an example embodiment may include an incident manager data processing system 110 and one or more incident team member data processing systems 120 in communication with one another via a network 130. As will be discussed, the incident manager data processor 110 may be configured for receiving information from and providing information to an incident manager. The team member data processing systems may each be configured for receiving information from and providing information to an individual incident resolution team member. All of these systems may be connected to one another via the network 130 through the use of collaboration software. Any or all of the incident manager system 110 and the team member systems 120 may also be configured to initiate and/or monitor the results of actions in furtherance of resolving a system incident.

The resolution system 100 may also include or may be in communication with a system monitor 140 configured for monitoring and providing information on operations of a target system or object 10. The system monitor 140 is, in particular, configured to determine whether the target system or object 10 has experienced or is experiencing a service failure or other incident. As used herein, a system incident may be any instance where the monitored system 10 is in a measurably undesirable state (e.g., a system or component has crashed or suffered a hardware failure, an application has a memory leak or a performance issue, etc.). The system monitor 140 may be further configured to obtain diagnostic and other operating information for the monitored system 10 and communicate to appropriate recipient systems via the network 130.

The resolution system 100 includes a resolution facilitation server ("RFS") 160 that is configured for receiving information from any or all of the incident management system 110, the team member systems 120 and the system monitor 140 via the network 130. The RFS 160 may include or be in communication with an incident information database 150 that has stored therein historical information on previous system incidents and the actions taken in furtherance of resolution of such incidents. As will be discussed in more detail hereafter, the RFS 160 may be configured to use the historical information from the database 150 to establish a machine learning model capable of determining resolution action recommendations and providing such recommendations to the incident manager system 110. The RFS 160 may further be configured to use subsequent actions and action results to update and refine the machine learning model.

Figure 2:
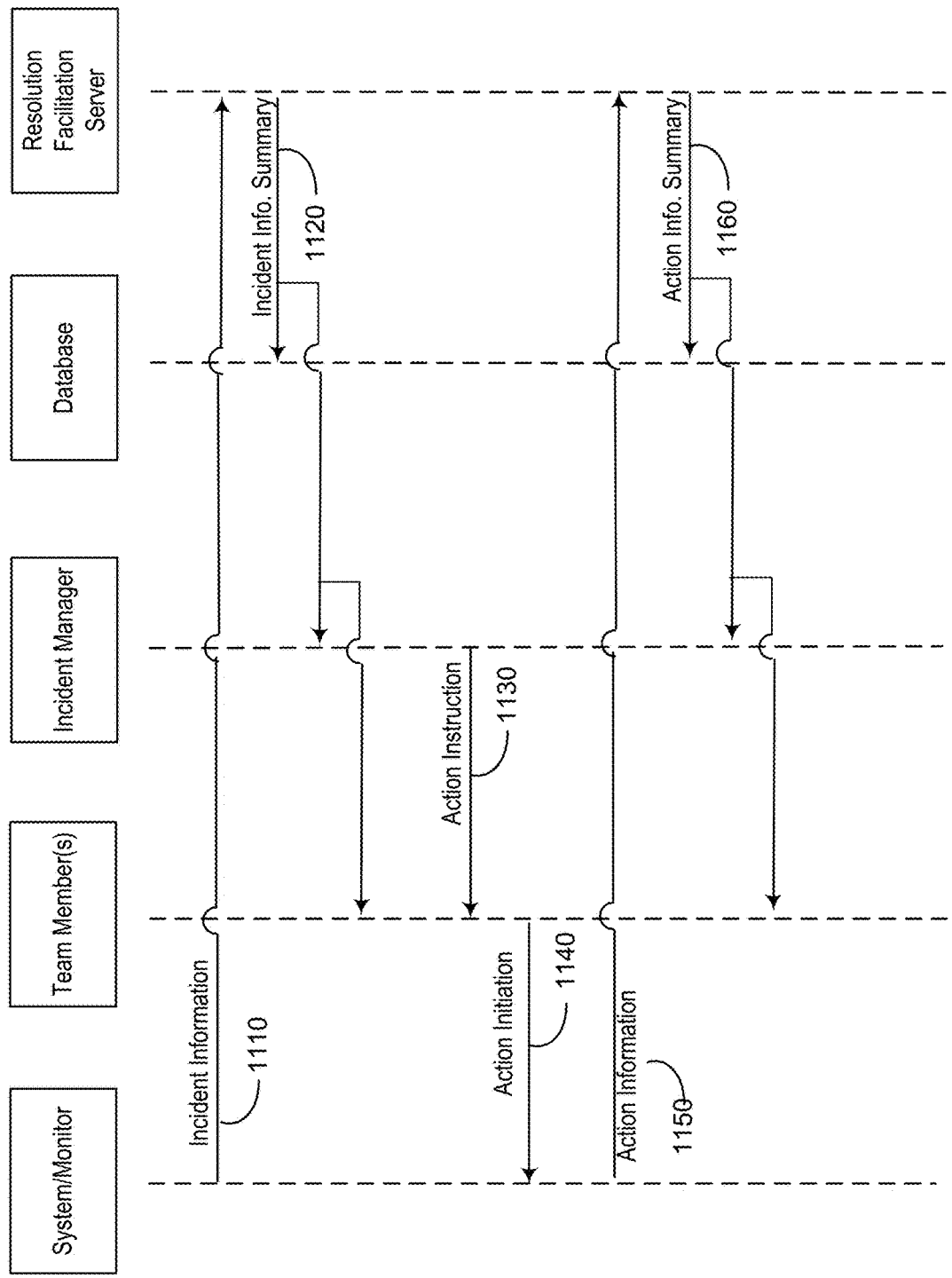
FIG. 2 is a sequence diagram illustrating a sequence of actions in facilitating incident resolution according to an embodiment of the invention.

The sequence diagram of FIG. 2 illustrates a typical operation scenario for distributing information and implementing an action on the incident resolution system 100. In the illustrated scenario, a failure or unacceptable performance loss in the target system 10 has been identified by the system monitor 140. At 1110, incident information obtained by the system monitor 140 from the target system 10 is sent to the RFS 160. The incident information may include information regarding various operating parameters for the system 10 and/or specific parameters associated with the identified failure or performance loss. The information may include current operating parameters and/or past parameters and associated times at intervals surrounding the start of the incident. The RFS 160 may assemble the incident information into a usable form and, at 1120, send it to the incident manager and, in some embodiments, one or more team members. The RFS 160 may also establish an incident record in the database 150 that includes some or all of the incident information. It will be understood that actions 1110 and 1120 may be repeated on a continuous, periodic, or as-needed basis throughout the incident resolution process to assure that all involved personnel have access to current incident status.

At 1130, the incident manager issues an instruction to one or more team members to initiate an action in furtherance of incident resolution. It will be understood that actions in furtherance of resolution may have widely different degrees of importance and that some may be deemed critical actions that may be identified, tracked and controlled. Critical actions may be common-place actions such as those necessary to establish the bridge call or to assure that necessary personnel are contacted. Critical actions may also include more significant actions taken to "fix the problem" (e.g., initiation of a reboot of a particular system component). Certain action types may be predetermined to be critical actions while others may be identified as critical actions by the incident manager. In some embodiments, critical actions may be identified based on analysis of prior incident history.

While the diagram in FIG. 2 shows the action instruction as being sent to one or more team members for execution or initiation, there may be instances where the action instruction is directed to other personnel or system components for direct action. For example, an action instruction may be sent by the incident manager directly to the resolution facilitation server. Such an action could be, for example, to request information or a predicted result for a proposed action. In some cases, the action may simply be to record the occurrence of a particular event (e.g., a critical event) and/or to identify and track a critical action.

At 1140, the one or more team members may initiate the requested action, e.g., by implementing a command to the target system or to the system monitor. At 1150, the system monitor may return action result information to the resolution facilitation server. In some instances, this may be or include an update to the status and/or operating parameters of the target system. The RFS may assemble and analyze the received information and, at 1160, may send some or all of the information (or a summary) to the incident manager and, in some embodiments, to one or more of the team members. The RFS may also evaluate the action result and store information in the incident information database regarding the nature of the action taken and the result. In some embodiments, the RFS may also update the machine learning model based on the additional action/result information.

Figure 3:
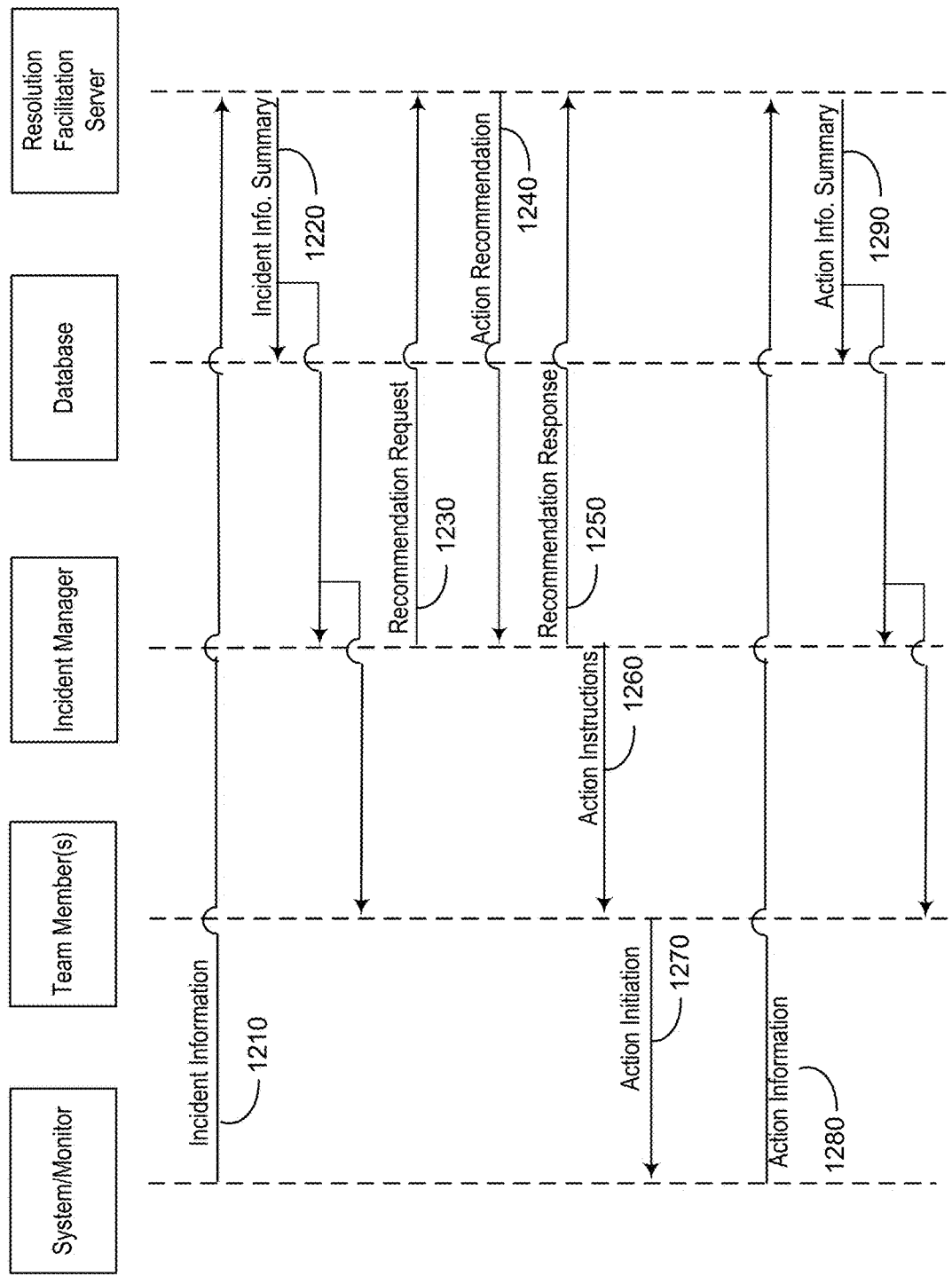
FIG. 3 is a sequence diagram illustrating a sequence of actions in facilitating incident resolution according to an embodiment of the invention.

The sequence diagram of FIG. 3 illustrates a typical operation scenario for the system 100 in which an action recommendation from the RFS 160 is implemented. In the illustrated scenario, the system monitor 140 provides, at 1210, target system incident information to the RFS 160. The incident information may include information regarding various operating parameters for the system 10 and/or specific parameters associated with the identified failure or performance loss. The information may include current operating parameters and/or past parameters and associated times at intervals surrounding the start of the incident. The RFS 160 may assemble the incident information into a usable form and, at 1220, send it to the incident manager and, in some embodiments, one or more team members. The RFS 160 may also establish an incident record in the database 150 that includes some or all of the incident information. It will be understood that actions 1210 and 1220 may be repeated on a continuous, periodic, or as-needed basis throughout the incident resolution process to assure that all involved personnel have access to current incident status.

At 1230, the incident manager may send an action recommendation request to the RFS 160. The RFS 160 may then initiate one or more simulations using the machine learning model to identify one or more actions that may be taken in furtherance of resolving the incident. In some embodiments, the RFS 160 may calculate a relative confidence level or otherwise score the potential value and/or likelihood of success of potential actions. These measures can be used to rank potential actions and make determinations as to whether they meet criteria for including in a recommendation. At 1240, the RFS 160 may send an action recommendation with one or more recommended actions to the incident manager. In some embodiments, the action recommendation may include a confidence level and/or other score for each recommended action. At 1250, the incident manager may return a recommendation response to the RFS 160. The recommendation response may, in some embodiments, be a simple binary response for each recommended action indicating that (1) the action will be taken (recommendation acknowledged/accepted) or (2) the recommended action will not be taken (recommendation declined/ignored). Regardless of whether the recommendation response is positive or negative, the RFS may use it to score the recommendation and to update the machine learning model, thus improving the likelihood of a positive recommendation result in the future. In some embodiments, when a positive recommendation response is received, the RFS 160 may initiate a tracking of the recommended action in anticipation of a result, which would then be used to further refine the machine learning model.

In cases where the action recommendation is accepted, the incident manager may, at 1260, issue an instruction to initiate an action in furtherance of incident resolution. At 1270, the requested action may be initiated and, at 1280, the system monitor may return recommended action result information to the RFS 160. In some instances, this may be or include an update to the status and/or operating parameters of the target system. The RFS 160 may assemble and analyze the received information and, at 1290, may send some or all of the information (or a summary) to the incident manager and, in some embodiments, to one or more of the team members. The RFS 160 may also evaluate the action result and store information in the incident information database regarding the nature of the action taken and the result. In some embodiments, the RFS 160 may also update the machine learning model based on the additional action/result information.

In the above-described scenario, an action recommendation is made by the RFS 160 in response to a request by the incident manager. In some embodiments, the RFS 160 may be configured to construct and send an action recommendation without receiving an explicit request. This could be triggered by the occurrence of other events and/or as the result of certain predetermined triggering criteria being met. In some embodiments, the RFS 160 may be configured to continuously or at regular intervals evaluate potential actions without receiving a recommendation request. In such embodiments, the recommendation triggering criteria could be or include having a potential action achieve a target score relating to confidence level and/or likelihood of success at resolving some or all of the system problems associated with the incident. If a potential action identified by model simulation(s) meets the triggering criteria, the RFS 160 may construct a recommendation and send it to the incident manager.

The constituents of the incident resolution system 100 will now be discussed in more detail. The manager and team member processing systems 110, 120 may be or include any network-enabled processor computer system or device including, but not limited to, any server, network appliance, personal computer (PC), workstation, mobile processing device such as a smart phone, smart pad, handheld PC, or personal digital assistant (PDA), or card-mounted microprocessor capable of direct or indirect network communication. The network-enabled computer systems used to carry out the methods contemplated by the invention may execute one or more software applications to, for example, receive data as input from an entity accessing the network-enabled computer system, process received data, transmit data over a network, and receive data over a network. The network-enabled computer systems may also include one or more software applications to provide notifications to a user. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

The network 130 may be or include a wireless network, a wired network or any combination of wireless network and wired network, and may be configured to connect the incident manager data processing system 110 and the incident team member data processing systems 120 to each other and to the other system components. The network 130 may, for example, include one or more of a fiber optics network, a passive optical network, a cable network, an Internet network, a satellite network, a wireless LAN, a Global System for Mobile Communication (GSM), a Personal Communication Service (PCS), a Personal Area Network, Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, the network 130 may include, without limitation, telephone lines, fiber optics, IEEE Ethernet 902.3, a wide area network (WAN), a wireless personal area network, a local area network (LAN), or a global network such as the Internet. In addition, the network 130 may support an Internet network, a wireless communication network, a cellular network, or the like, or any combination thereof. The network 130 may further include one network, or any number of the exemplary types of networks mentioned above, operating as a stand-alone network or in cooperation with each other. The network 130 may utilize one or more protocols of one or more network elements to which they are communicatively coupled. The network 130 may translate to or from other protocols to one or more protocols of network devices. Although the network 130 is depicted as a single network, it should be appreciated that according to one or more examples, the network 130 may comprise a plurality of interconnected networks, such as, for example, the Internet, a service provider's network, a cable television network, corporate networks, such as credit card association networks, and home networks.

Figure 4:
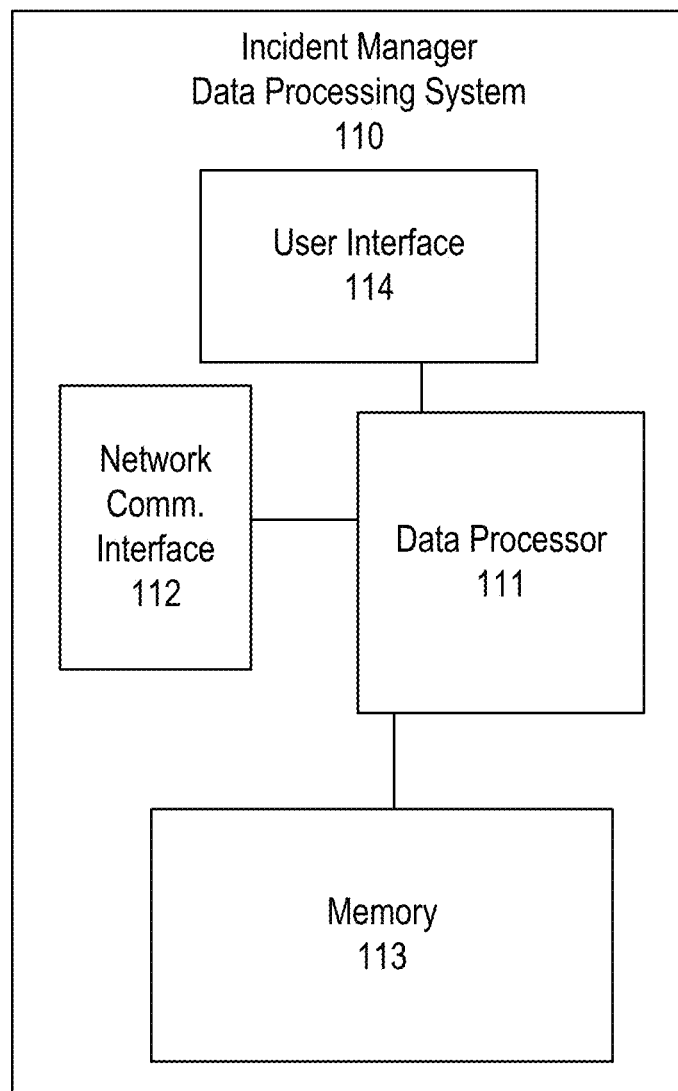
FIG. 4 is a schematic representation of an incident manager data processing system usable in implementing embodiments of the invention.

With reference to FIG. 4, the incident manager data processing system 110 may be or include any network-enabled data processing and/or communication device including, but not limited to a smartphone, a laptop, a desktop computer, and a tablet. In particular embodiments, the manager data processing system 110 includes an on-board data processor 111 in communication with a memory module 113, a user interface 114, and a communication interface 112. In some embodiments, the manager data processing system 110 may include an image capturing device (e.g., a digital camera) and/or an audio input/recording device. The data processor 111 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 113 can be a read-only memory, write-once read-multiple memory or read/write memory, e.g., RAM, ROM and EEPROM, and the device 110 can include one or more of these memories.

The user interface 114 may include one or more user input mechanisms, which can be any device for entering information and instructions into the manager data processing system 110, such as a touch-screen, keyboard, mouse, cursor-control device, microphone, stylus, or digital camera. The user interface 114 may also include a display, which can be any type of device for presenting visual information such as a computer monitor, a flat panel display, and a mobile device screen, including liquid crystal displays, light-emitting diode displays, plasma panels, and cathode ray tube displays. In some embodiments, the user interface 114 may be configured to capture audio-visual communications between a user of the system 110 and users of other network-connected data processing systems (e.g., team member data processing systems 120).

The communication interface 112 is configured to establish and support wired or wireless data communication capability for connecting the device 110 to the network 130, or other communication network. The communication interface 112 can also be configured to support communication with a short-range wireless communication interface, such as near field communication (NFC), radio-frequency identification, and Bluetooth.

In embodiments of the invention, the memory 113 may have stored therein one or more applications usable by the data processor 111 to conduct and/or monitor exchanges with the RFS 160 and team member data processing systems 120. In particular, the memory may have stored therein an incident resolution facilitation application configured for monitoring communications from the system monitor and the RFS 160 and for receiving and displaying incident resolution information from the RFS 160. The application may also be configured for transmitting action instructions, tracking action initiation and resolution, and receiving action result information. The application may further be configured for constructing an action recommendation request, transmitting such a request to the RFS 160 and receiving from the RFS 160 an action recommendation. The application may also be configured for presenting the action recommendation to the user (e.g., an incident manager), for receiving recommendation response information from the user, and for transmitting a recommendation response to the RFS 160.

In some embodiments, the resolution facilitation application may be configured to receive and interpret audio instructions from the user of the manager data processing system 110. In particular, the application may be configured to recognize a particular audio cue to indicate that an audio instruction will follow, receive and interpret the subsequent audio instruction, and then take action in accordance with the instruction. For example, during an application-monitored bridge call, the incident manager may determine that an action recommendation should be requested. The incident manager may then verbalize the audio cue and audibly request that an action request be sent to the RFS 160 without otherwise interrupting the call. The application would then construct and transmit the request to the RFS 160. Other examples could include instructions to note the occurrence of events, instructions to identify and track critical actions, or evaluate a hypothetical action.

Like the incident manager data processing system 110, the team member data processing systems 120 may be or include any network-enabled data processing and/or communication device including, but not limited to a smartphone, a laptop, a desktop computer, and a tablet. The team member data processing systems 120 would also have a data processor, memory, a user interface and a communication interface. The memory of the team member data processing systems 120 may also have an incident resolution facilitation application stored therein, but with lesser functionality than is provided to the manager system 110. The team member system application may, for example, be configured for receiving and displaying information received from the RFS 160 and for tracking communications and actions involving a particular team member system 120.

The system monitor 140 may be any combination of a network-enabled processor and software configured to monitor the target system 10 or a particular software application operating thereon to determine operating status and identify and track the occurrence of an incident thereon or associated therewith. The system monitor 140 may track operating parameters and at regular intervals and/or upon command provide incident information to the RFS 160 and/or other system components/actors.

The incident information database 150 is or includes one or more data storage units having stored therein searchable historical data records for enterprise system incident and incident resolution efforts. These data records may include information for incidents occurring on the target system 10 and/or other incident-stricken systems. For each incident, the recorded information may include, without limitation, time-based information on the nature and characteristics of the incident, the state of the stricken system, resources available and resources used to resolve the incident, critical actions taken in furtherance of incident resolution and information on the results of each such action, and external conditions affecting incident causes or resolution. In particular embodiments, critical actions may be categorized according to action type, resources required, relative effectiveness, etc. In some embodiments, common critical actions may be pre-defined or fall into pre-defined categories. Stored incident information may also include audio and/or video recordings of communications between resolution team members.

Figure 5:
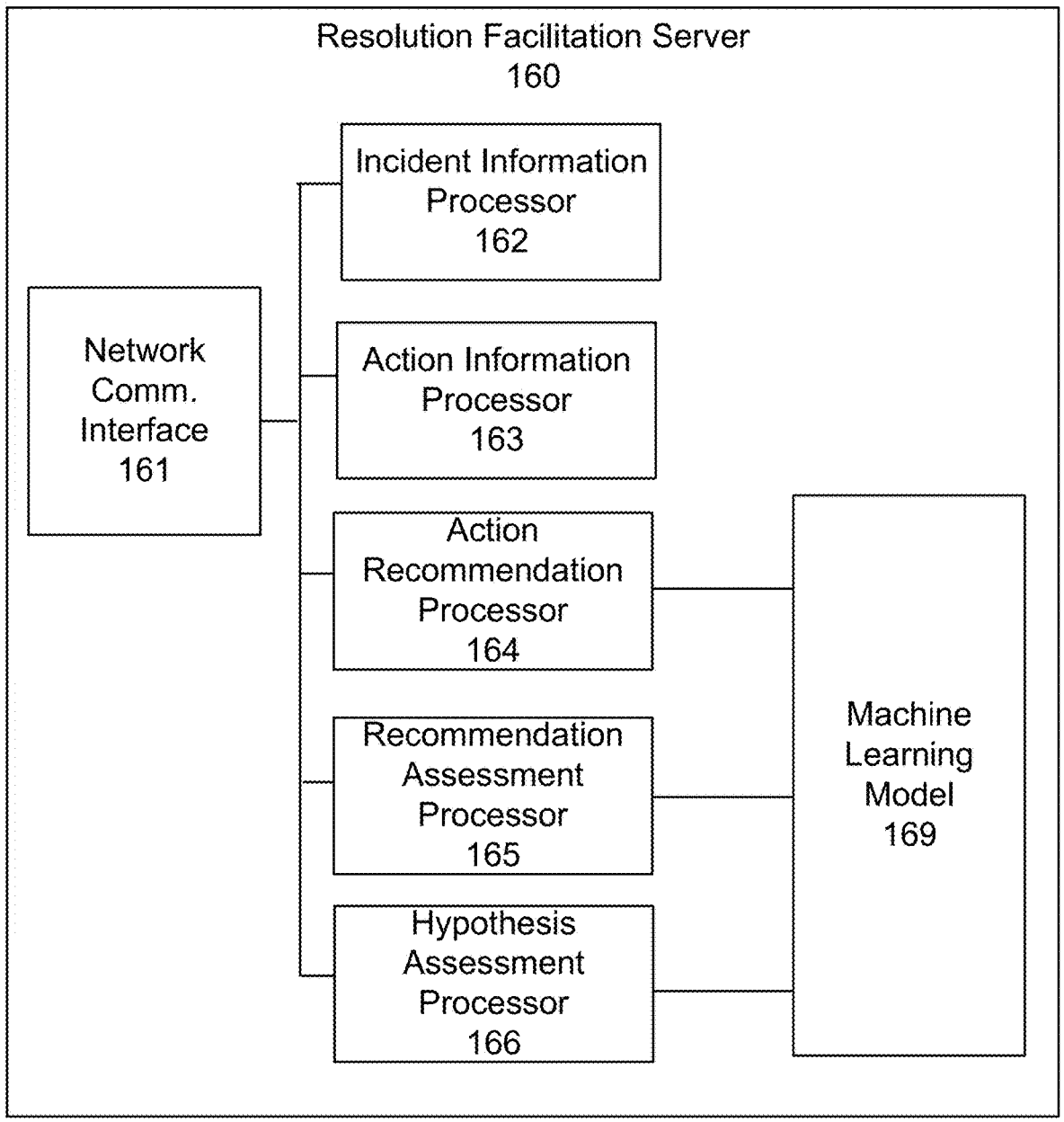
FIG. 5 is a schematic representation of a resolution facilitation server according to an embodiment of the invention.

The RFS 160 may include one or more network-enabled data processing systems configured for communication with each other and with other components of the incident resolution system 100 via the network 130 or other networks. With reference to FIG. 5, the RFS 160 may, in particular, include a network communication interface 161 in communication with an incident information processor 162, an action information processor 163, an action recommendation processor 164, and a recommendation assessment processor 165. In some embodiments, the RFS 160 may also include a hypothesis assessment processor 166.

The incident information processor 162 may be an automated data processor configured to receive incident information from any one or more of the system monitor 140, incident manager data processing system 110, and the team member data processing systems 120. The incident information processor 162 may, in particular, be configured to receive incident and system operating parameter information for the target system 10 from the system monitor 140. The incident information processor 162 may be further configured to assemble and analyze this information and compare it to information on previous incidents to classify and summarize the primary characteristics of the incident and potential impacts on other systems and applications. The incident information processor 162 may also be configured to summarize key information regarding the incident in a graphic format (e.g., as an incident dashboard) and transmit it or make it available to the incident manager data processing system 110 and appropriate team member data processing systems 120. The incident information processor 162 may be configured to update the graphic incident summary display on a continuous or periodic basis or upon identifying a change to any significant information presented therein. The graphic display may include, without limitation, target system status information, information regarding pending or implemented critical actions, and other information identified by the incident manager as significant.

The incident information processor 162 may be configured for receiving and storing via the network communication interface 161 time-based incident information for the incident in the incident information database 150. This may include some or all of the information received from the system monitor 140 and information received from any system component regarding critical events or actions. Such information may include, for example, the actions taken to identify and contact personnel for the incident resolution team and tracking of participation and actions by the identified personnel. The incident information processor 162 may also record in the incident information database 150 audio-visual and other communications between and among the incident manager and team member processing systems 110, 120, the system monitor 140, and the RFS 160.

In some embodiments, the incident information processor 162 may be configured to receive information from other sources that could affect team activities or system performance. For example, the processor 162 may access information on personnel and system resource availability. Any or all such information may be stored in the incident information database 150 so that its impact may be incorporated into models for identifying resolution actions in the future.

The incident information processor 162 may be configured to construct a graphic dashboard that can be accessed by the incident manager and team member processing systems 110, 120. The dashboard may be configured to conveniently present current incident status information as well as information regarding critical actions that have been taken in furtherance of incident resolution.

The action information processor 163 may be an automated data processor configured for receiving via the network communication interface 161 action information regarding critical actions taken in furtherance of incident resolution. The action information may be received from the manager data processing system 110 or any of the team member data processing systems 120. In typical embodiments, critical actions may be identified by the incident manager or instructions to take a critical action may be sent by the incident manager to the appropriate personnel or system. In some instances, the incident manager may have updated information on a previously initiated action. In any of the instances, action information may be received by the action information processor 163 from the incident manager processing system 110. The action information may include an action type, a time stamp, and a description. If the action information relates to a newly identified or initiated action, the incident processing manager may assign an action-unique identifier to assist in tracking and evaluating the resolution of the action. Action information for a previously identified or initiated action may include the previously assigned action-unique identifier. Such information may also include a status of the action and other information relating to the effect of the action. In some instances, the action information may include an indication of a final resolution of the action.

In some embodiments, the action information processor 163 may be configured to store action information for critical actions in the incident information database 150. In other embodiments, the action information processor 163 may be configured to send the action information to the incident information processor 162 for processing and/or storage in the incident information database. In either case, the action information processor 163 may be configured to determine if a particular critical action is a pre-defined critical action or falls within a predefined action category. Action information stored in the incident information database 150 may include action identification, times associated with initiation and, if applicable, resolution, and, in some embodiments, a score of the relative effectiveness of the action. Action information may also include the resources used in furtherance of the action and, if not otherwise available in the database, the resources available for use at the time the action was initiated.

The action recommendation processor 164 may be an automated data processor configured for receiving and transmitting communications via the network communication interface 161. The action recommendation processor 164 may be configured to determine a need for or respond to a request for a recommendation for an action to be taken in furtherance of resolving a system incident. In typical embodiments, the action recommendation processor 164 may receive a request for an action recommendation from the incident manager processing system 110. The request may be for a general recommendation based on current status of the target system 10 and all other available incident information, including information on previous actions and their resolutions. Alternatively, the request may include limitations on the recommendation. This could include, for example limitations to the type or timing of the action or on the resources to be used to carry out the recommended action. In some embodiments, the action recommendation processor 164 may be configured to use predetermined criteria for determining that an action recommendation should be generated. Such criteria could include, for example, the occurrence of specific critical events such as the initial identification of an incident or initiation of a bridge conference. In some embodiments, the recommendation processor 164 the criteria could be established so that action recommendations are determined at regular intervals. In particular embodiments, the action recommendation processor 164 may be configured to continually or periodically determine potential actions that might be recommended, but will make an action recommendation only if a potential action exceeds a minimum confidence score level.

Upon establishing that an action recommendation should be determined, the action recommendation processor 164 may initiate the process of generating a recommendation. In various embodiments of the invention, action recommendations are established based on a combination of available resolution resources, current system status, and historical information for previous incident resolution efforts. As previously discussed, the incident information database 150 comprises historical records regarding prior system incidents and their resolution. This information may be fed to a machine learning-based incident resolution model 169 on a continuous or periodic basis or, in some embodiments, upon request or upon submission of new information to the database 150. The incident information from the incident database 150 may be used to train the machine learning model 169 to identify and establish the likely relative value of predefined actions that may be taken to resolve a current incident. Using current incident state and resource information, the machine learning model 169 may be used to simulate the likely effect of thousands of potential actions. In doing so, the model 169 would account for similarities and differences between current and prior incident characteristics and available resources. The model 169 may also take into account instances of previous action recommendations made during both current and prior incident resolution efforts. In particular, the model may account for the response of the incident manager to such previous recommendations (e.g., establishing a positive association with accepted recommendations and a negative association with declined recommendations).

The machine learning model 169 may be configured to determine an outcome state for each possible action given the current state of the system 10. The model 169 may be configured to, based on the historical incident information and current state parameters for the system 10 and using statistical weighting values, establish a relative confidence level and/or a score reflecting a degree of likelihood of the outcome state. In some embodiments, a predefined potential action may have one or more associated parameters that can be used to establish a relative degree of effectiveness of the action.

In exemplary embodiments, the machine learning model 169 may be an unsupervised learning model that makes use of any of various known algorithms. The exemplary model can utilize various neural networks, such as convolutional neural networks ("CNN") or recurrent neural networks ("RNN") to generate the machine learning model. In exemplary embodiments, a CNN can include one or more convolutional layers (e.g., often with a subsampling step), followed by one or more fully connected layers as in a standard multilayer neural network. CNNs can utilize local connections, and can have tied weights followed by some form of pooling which can result in translation invariant features.

RNNs are a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. RNNs may include two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The action recommendation processor 164 may use the machine learning model 169 to obtain one or more candidate actions with each candidate having an associated relative confidence level or likely effectiveness score. The action recommendation processor 164 may be configured to rank the candidate actions and/or determine whether the candidate actions meet predetermined threshold values for recommendation. The action recommendation processor 164 may use ranking and/or threshold criteria to determine which, if any, of the candidate actions should be recommended to the incident manager. For each action that meets this criteria, the recommendation processor 164 may construct an action recommendation that identifies and describes the action. The recommendation may also include a predicted outcome description and a relative confidence level or score indicative of the likelihood of achieving the predicted outcome. The action recommendation processor 164 may be configured to transmit the recommendation to the incident manager data processing system 110. It may also transmit the recommendation to either or both of the recommendation assessment processor 165 and the incident information database 150.

The action recommendation processor 164 may be further configured to receive a recommendation response from the incident manager data processing system 110. The recommendation response may indicate that the recommended action is acknowledged or accepted (i.e., will be implemented) or will be ignored/declined (i.e., will not be implemented). If the recommendation is accepted, the incident manager may then send instructions to the appropriate system or personnel to initiate the recommended action, which is tracked by the action information processor 163 as described above. If the recommendation is declined, no action is initiated. In either case, the response may be used by the recommendation assessment processor 165 to evaluate the recommendation and to provide feedback to the machine learning model 169.

The recommendation assessment processor 165 may be an automated data processor configured for receiving information about a response recommendation and, if applicable, the results of the recommended action. This information may be used to establish feedback for further teaching of the machine learning model. In some embodiments, the recommendation assessment processor may be configured to assign a relative score to the recommendation based on initial response of the incident manager and based on an evaluation of the effect of the action. Information on the relative effect of the action may be received from the incident manager data processing system 110 or, in some embodiments, from any of the team member data processing systems 120. This information and/or the relative score for the recommendation may then be sent to the incident information database 150 and the machine learning model 169.

To illustrate the recommendation process, a scenario may be considered in which the action recommendation processor 164 and the machine learning model 169 collectively determine that a system reboot should be attempted. The recommendation processor 164 accordingly sends an action recommendation to the incident manager data processing system 110. The incident manager data processing system 110 receives an acceptance indication from the incident manager and transmits it to the action recommendation processor 164 and (directly or indirectly) to the recommendation assessment processor 165. The incident manager also sends instructions for the system to be rebooted. This action is also identified to the action information processor 163 which begins tracking the action. Upon completion of the reboot, the state of the target system 10 is assessed and a determination is made that the reboot had no significant impact. The incident manager may then transmit an action response indication to the action information processor 163 and the recommendation assessment processor 165 indicating that the projected outcome of the recommend action was not achieved. The recommendation assessment processor 165 then uses all available information to assess the recommendation, including the positive initial response from the incident manager and the eventual negative result of the action. The evaluation may then be used to update the machine learning model 169.

In the above scenario, the action recommendation processor 164 determines a recommended action and proposes it to the incident manager, who accepts or declines the recommendation. In some embodiments, the action recommendation processor 164 may be configured to evaluate certain actions to determine if they should be initiated automatically without going through the recommendation process. In these embodiments, the action recommendation processor 164 may be provided instructions to (or criteria to evaluate whether to) immediately implement an action that the incident manager is almost certain to accept. For example, at the onset of an incident, the machine learning model 169 may recommend the notification of certain essential personnel. The action recommendation processor 164 may be provided with instructions to immediately initiate this action without waiting for incident manager approval. Allowing the system to automatically implement such common actions may greatly increase the speed and efficiency of resolution efforts.

The use of the recommendation processor 164, recommendation assessment processor 165, and the machine learning model 169 provides an automated tool that leverages historic incident data in a far more efficient manner than relying solely on the institutional memory and experience of the incident team. Nevertheless, there are many instances where the team members are called upon to "think outside the box" or where a team member simply has an idea for an action that has not previously been tried. The action idea may be referred to as a hypothesis and actual implementation of the idea may be referred to as a hypothesis check. A hypothesis check may be considered a critical action that is of a type not previously implemented or characterized.

Upon initiation of a hypothesis check, the incident manager may notify the action information processor 163 of the action. The notification itself may identify the action as a hypothesis check. In some embodiments, however, the action information processor 163 may be configured to compare the attributes of any action to previously defined actions (or to some or all previous actions in the incident information database 150) to determine if the action meets criteria for identification as a hypothesis check. In either case, once an action is identified as a hypothesis check, the processor 163 may include that identification in subsequent communications and information summaries.

In some instances, a hypothesized action may involve a significant amount of time and resources and the hypothesized outcome is uncertain. There may also be the possibility that the action, while novel in some respects, may have similarities to previously implemented actions documented in the incident information database 150. In either case, it would be advantageous to test the hypothesis prior to implementation. Accordingly, embodiments of the invention provide for the use of the machine learning model 169 to assess hypothesized actions. As shown in FIG. 5, the resolution facilitation server 160 may include a hypothesis assessment processor 166 in communication with the network communication interface 161 and the machine learning model 169. The hypothesis assessment processor 166 may be configured to receive a hypothesis assessment request (e.g., from the incident manager data processing system 110) identifying a hypothesized action. The hypothesis assessment processor 166 may then use historical incident data and the machine learning model 169 to determine an expected outcome of the hypothesized action. The hypothesis assessment processor 166 may be further configured to determine a confidence level and/or likely effectiveness score in a manner similar to that discussed above in relation to recommend actions. The hypothesis assessment processor 166 may then transmit an assessment notification to the incident manager data processing system 110. The assessment notification may include identification of the likely outcome (e.g., effect on the state of the system 10) and the confidence level and/or effectiveness score.

Figure 6:
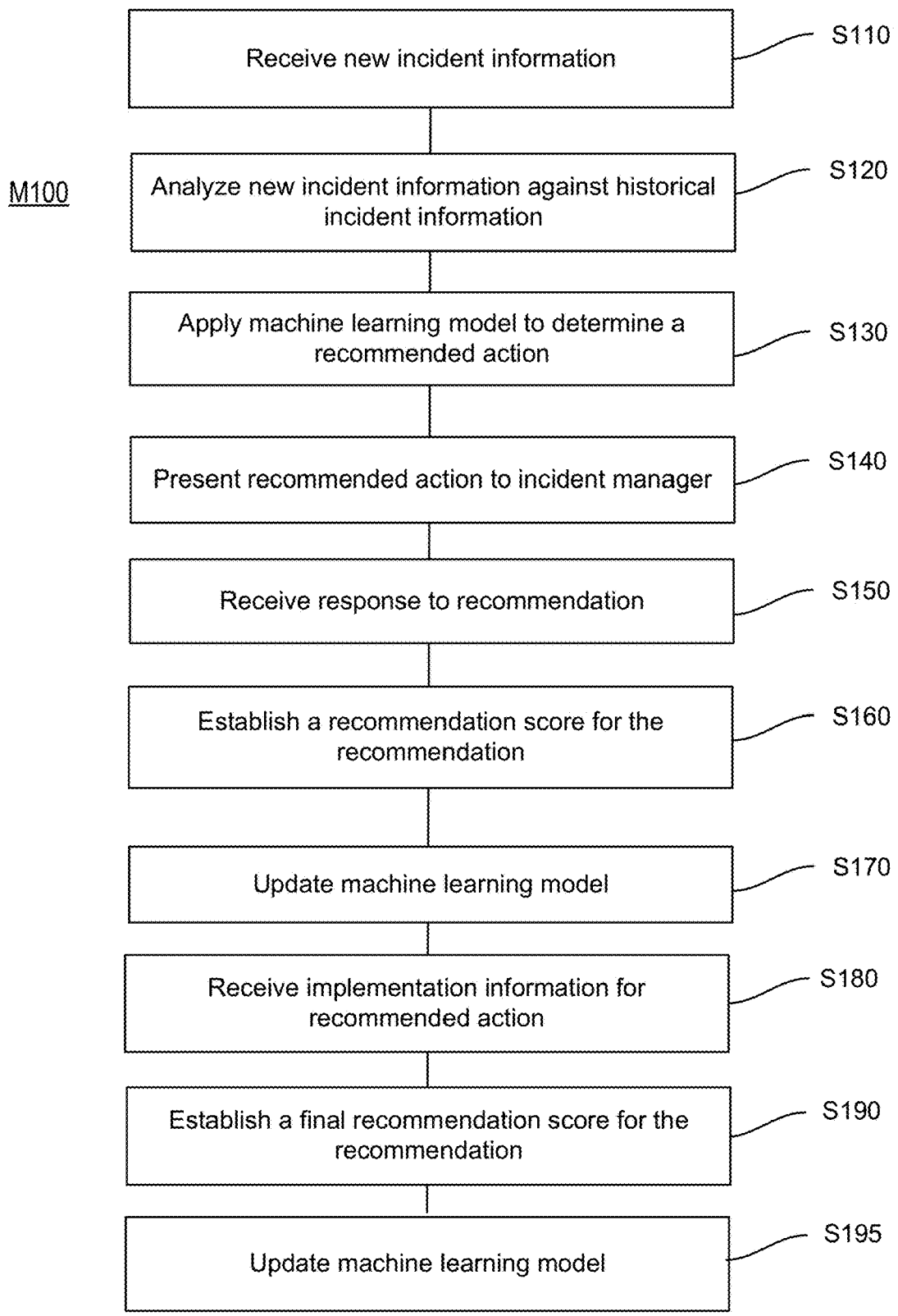
FIG. 6 is a flow chart of actions in a method of facilitating incident resolution according to an embodiment of the invention.

FIG. 6 illustrates a method M100 of facilitating resolution of an incident in or on a target system according to an illustrative embodiment of the invention. While the method M100 will be described in the context of system 100 of FIG. 1, it will be understood that the method M100 may be implemented on other incident resolution arrangements as well. At S110 of the method M100, information regarding a new incident is received by the incident resolution system. Such information may, in particular, be received by a resolution facilitation server. The incident information may be or include information received from an automated monitoring system in communication with the target system. The information can include status information on one or more operating parameters of the target system. The incident information may also include information from an incident manager, incident resolution team members; and other sources. The RFS may assemble and process the incident information for presentation to team members and for storage in the incident information database. In some embodiments, the RFS may, at S120, categorize the incident and/or some or all of the incident information by analyzing and comparing the information to information for previous incidents stored in the incident information database. At S130, the server may use the incident information and a machine learning model to determine an action that can be recommended to the incident manager for resolving the incident. This can include assessing the effect of large numbers of (or all) possible actions that have been taken in the past. In some embodiments, the number of candidate actions can be reduced to those taken in incidents of the same type or having the characteristics similar to those of the current incident. The learning model may be provided with criteria for narrowing down and/or ranking candidate actions based on degree of positive effect and likelihood of success. The latter may be established by running a series of simulations to identify likelihood of a particular result. The server may also determine whether any of the action candidates meet minimum threshold criteria for making an action recommendation at all.

As previously described, the machine learning model may be trained using historical incident information previously stored in an incident database. The historical incident information may include information on critical actions taken during previous incidents along with coincident information on the afflicted processing systems and current state parameters therefor. The action information would include specific action details and results indicative of the effectiveness of each action.

If a candidate action meets criteria for recommendation, the RFS may transmit information on the recommended action to the incident manager processing system (or other user system) at S140. The action recommendation may also include estimated response result and a confidence level or other score relating to the likelihood of the result. At S150, the server receives a response to the recommendation from the incident manager system. This response indicates whether or not the recommended action will action will be implemented. At S160, the RFS may establish an initial score for the recommendation based on whether the response is positive or negative. At S170, the machine learning model may optionally be updated to reflect the initial score. In some embodiments, this update will only be made if the response is negative. If the response is positive, the update may be delayed until after the recommended action has been implements and the result of the action is known.

If the recommendation is accepted, the incident manager takes steps to implement the recommended action. At S180, the RFS receives information on the implementation of the action. This may include receiving information about the initiation of the action, including the time of initiation and other associated information (e.g., details of the action taken, resources used, target system state at the time of initiation, etc.). Action implementation information may also include action result or resolution information, including the time of resolution and information regarding the effect of the action taken. Depending on the action type, resolution information may include, for example, overall state of the target system and/or status information for particular system operating parameters. Where the recommended action relates to obtaining personnel resources, the action might be deemed to have been completed/resolved upon one or more particular team members having joined the resolution team bridge cal.

At S190, the RFS uses the action implementation information to determine a final score for the action recommendation. In general, the closer the implementation result to the expected result, the higher the recommendation score. The recommendation score and/or the action implementation information may then be used to update the machine learning model at S195.

Figure 7:
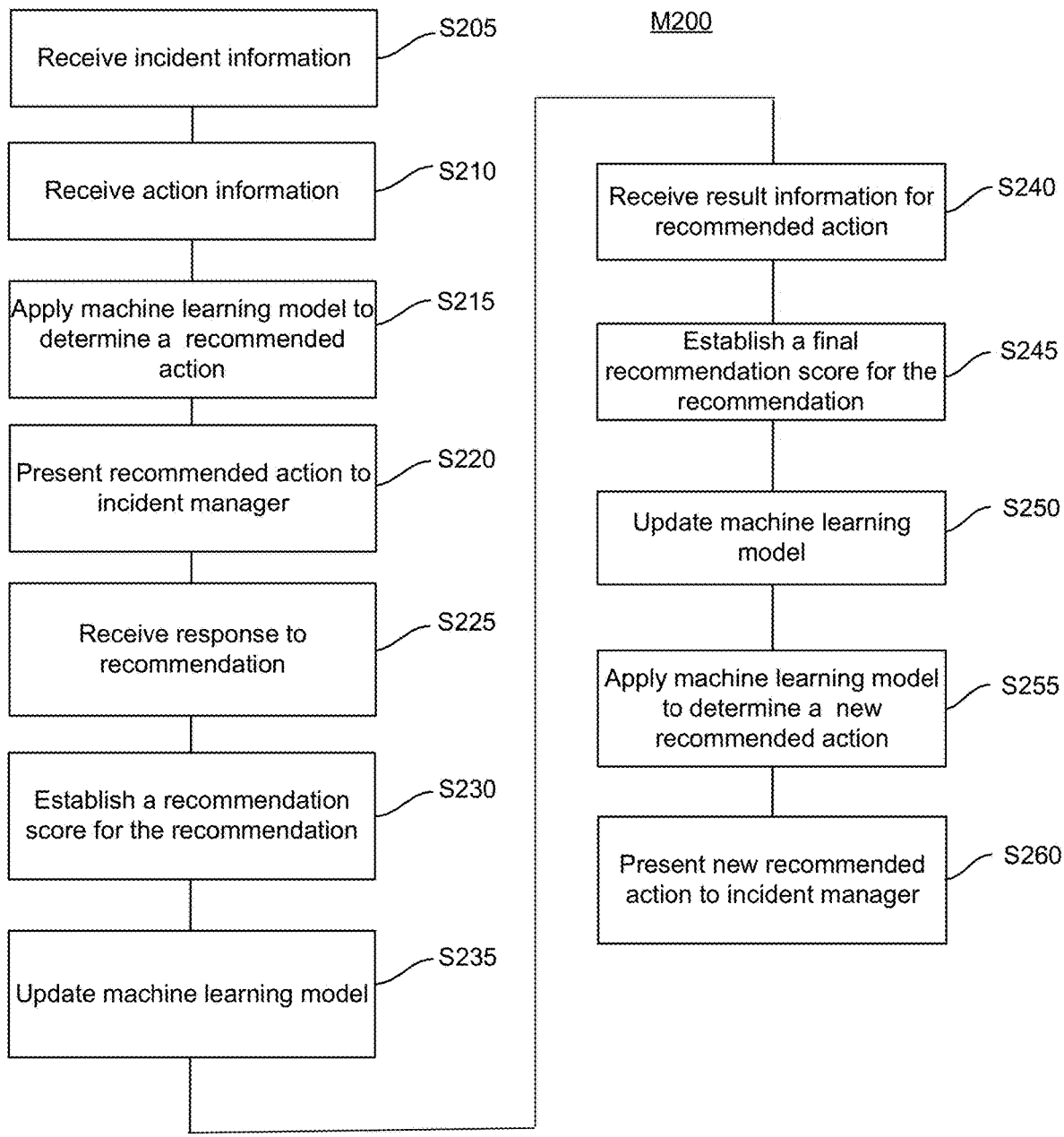
FIG. 7 is a flow chart of actions in a method of facilitating incident resolution according to an embodiment of the invention.

FIG. 7 illustrates a method M200 of facilitating resolution of an incident in or on a target system according to an illustrative embodiment of the invention. While the method M200 will be described in the context of system 100 of FIG. 1, it will be understood that the method M200 may be implemented on other incident resolution arrangements as well. At S205 of the method M200, information regarding an incident is received by the incident resolution system. Such information may, in particular, be received by a resolution facilitation server. The incident information may be or include information received from an automated monitoring system in communication with the target system. The information can include status information on one or more operating parameters of the target system. The incident information may also include information from an incident manager, incident resolution team members, and other sources. The action of receiving incident information may be repeated periodically or continuously throughout the incident resolution effort. The RFS may assemble and process the incident information for presentation to team members and for storage in the incident information database. At S210, the server may receive information on an action taken in furtherance of resolution of the incident. In many instances this information may be received from the incident manager or from the personnel or machine resources taking the action. The action information can include a description and details of the action and an initiation time stamp. Information received upon resolution of the action may include a resolution time stamp and information relating to the results of the action. Depending on the nature of the action, the resolution information may include changes in system state information.

At S215, the server may use the incident information, the action information, and a machine learning model to determine an action that can be recommended to the incident manager for resolving the incident. As in the previous embodiment, this can include assessing the likely effect of candidate actions and narrowing down and/or ranking the candidate actions based on degree of positive effect and likelihood of success. If a candidate action meets criteria for making a recommendation, the RFS may transmit information on the recommended action to the incident manager processing system (or other user system) at S220. The action recommendation may also include estimated response result and a confidence level or other score relating to the likelihood of the result. St S225, the server receives a response to the recommendation from the incident manager system indicating whether or not the recommended action will action will be implemented. In some embodiments, if the server does not receive a response within a certain period of time, the server may accept this as a negative response. At S230, the RFS may establish an initial score for the recommendation based on whether the response is positive or negative. At S235, the machine learning model may optionally be updated to reflect the initial score. In some embodiments, this update will only be made if the response is negative. If the response is positive, the update may be delayed until after the recommended action has been implements and the result of the action is known.

If the recommendation is accepted, the incident manager takes steps to implement the recommended action. At S240, the RFS receives information on the implementation of the action. This may include receiving information about the initiation of the action, including the time of initiation and other associated information (e.g., details of the action taken, resources used, target system state at the time of initiation, etc.). Action implementation information may also include action result or resolution information, including the time of resolution and information regarding the effect of the action taken. Depending on the action type, resolution information may include, for example, overall state of the target system and/or status information for particular system operating parameters. At S245, the RFS uses the action implementation information to determine a final score for the action recommendation. In general, the closer the implementation result to the expected result, the higher the recommendation score. The recommendation score and/or the action implementation information may then be used to update the machine learning model at S250.

The RFS may optionally use the updated machine learning model to determine a new recommended action at S255. The new recommended action may be transmitted to the incident manager processing system for display to the incident manager at S260.

Figure 8:
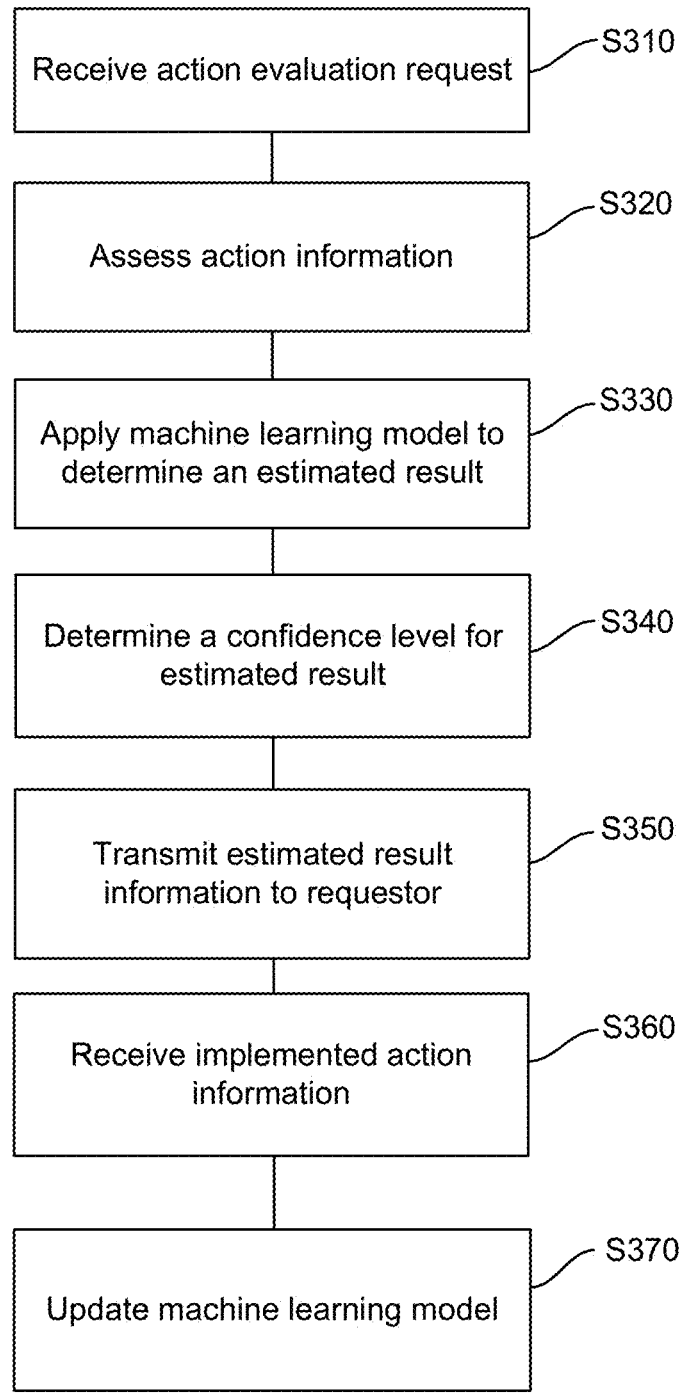
FIG. 8 is a flow chart of actions in a method of facilitating incident resolution according to an embodiment of the invention.

FIG. 8 illustrates a method M300 of facilitating resolution of an incident through the evaluation of a proposed action according to an embodiment of the invention. While the method M300 will be described in the context of system 100 of FIG. 1, it will be understood that the method M300 may be implemented on other incident resolution arrangements as well. The method M300 assumes that a facilitation resolution server has previously received incident information regarding an incident occurring on a target processing system. At S310 of method M300, the server receives a request to evaluate a proposed action. The request may be received from the incident manager or other user and may include identification and details of the proposed action. At S320, the resolution server may optionally compare the proposed action information to information for actions taken in previous incident resolution efforts. The server may further categorize and/or establish an initial assessment of the proposed action. At S330, the server may use a machine learning model developed, the incident information, and the proposed action information to determine an estimated result of the proposed action and a relative confidence level for the estimated result. As previously described, the machine learning model may be trained using historical incident information previously stored in an incident database. The historical incident information may include information on critical actions taken during previous incidents along with coincident information on the afflicted processing systems and current state parameters therefor. The action information would include specific action details and results indicative of the effectiveness of each action.

The output of the action at S330 may include an estimated outcome if the proposed action is implemented. At S340, the server may determine a relative confidence level in the estimated result. This may be based, at least in part, on the similarity of the proposed action characteristics and current incident characteristics to previous actions and incident characteristics. At S350, the server may transmit a response to the evaluation requester (e.g., the incident manager). The response may include the estimated result of the proposed action and the relative confidence level. Based on this response, the incident manager may implement the proposed action. At S360, the RFS may receive information regarding the implemented proposed action. In many instances this information may be received from the incident manager or from the personnel or machine resources taking the action. The action information may include an initiation time stamp, a resolution time stamp, and information relating to the results of the action. Depending on the nature of the action, the resolution information may include changes in system state information. At S370, the implemented action information may be used to update the machine learning model.

Figure 9:
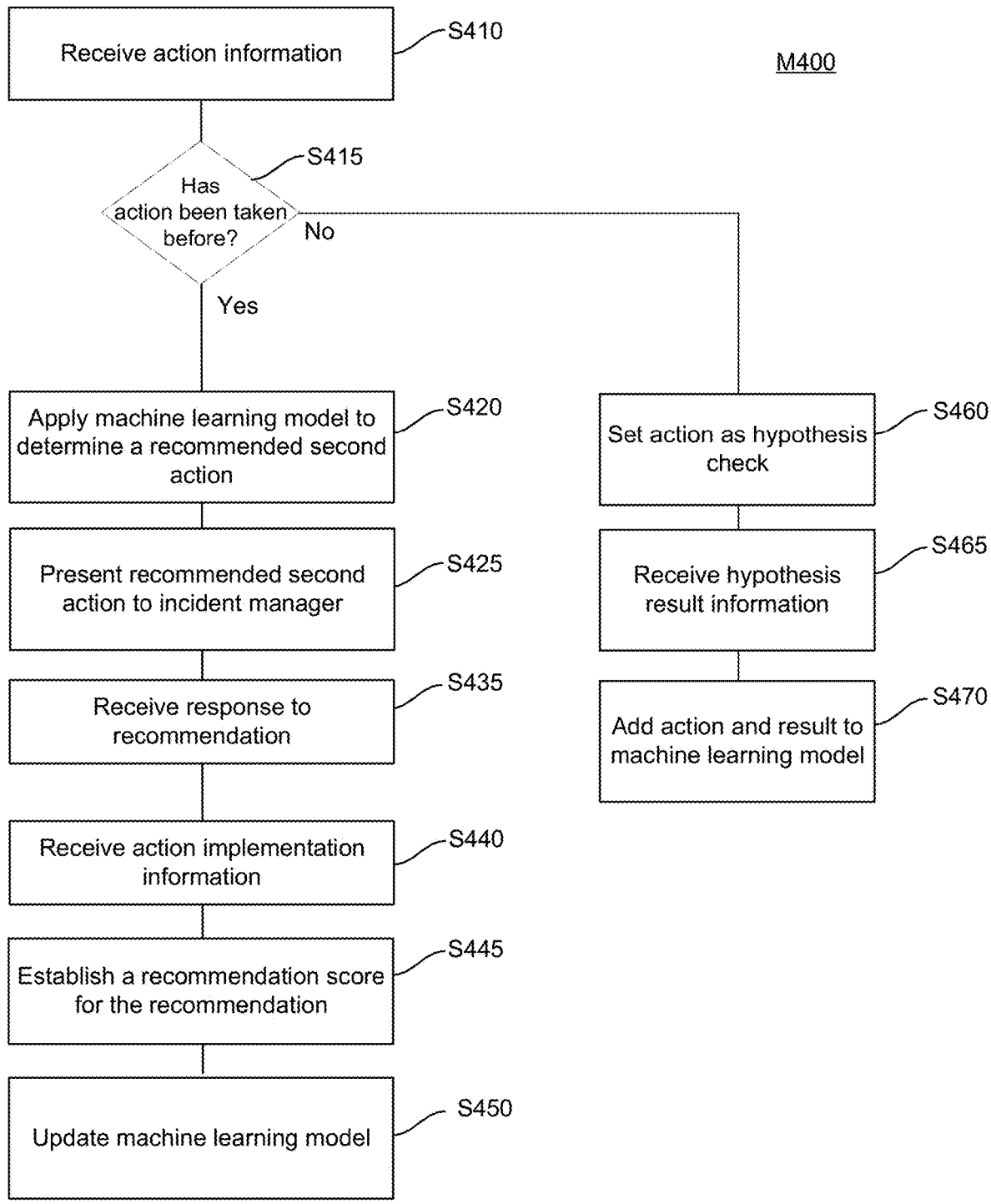
FIG. 9 is a flow chart of actions in a method of facilitating incident resolution according to an embodiment of the invention.

FIG. 9 illustrates a method M400 of facilitating resolution of an incident according to an embodiment of the invention. While the method M400 will be described in the context of system 100 of FIG. 1, it will be understood that the method M400 may be implemented on other incident resolution arrangements as well. The method M400 assumes that a facilitation resolution server has previously received incident information regarding an incident occurring on a target processing system. At S410 of method M400, a resolution facilitation server receives information on an action taken in furtherance of resolution of the incident. This information may be received from the incident manager or from the personnel or machine resources taking the action. The action information can include a description and details of the action and an initiation time stamp. At S415, the server determines whether the action is of a type that has previously been conducted. In some embodiments, this action may include comparing the characteristics of the current action to those of actions previously conducted as part of prior incident resolution efforts. Information on such prior actions may be extracted from the incident database for the comparison. Matching criteria can be used to determine whether a current action may be deemed to have previously been conducted. In some embodiments, the criteria may require that the current action exactly match a previously conducted action. In other embodiments, the action need only be of the same predefined type as a previous action. In some embodiments, rather than comparing to previous actions in the database, the action at S415 may include comparing the characteristics of the current action to the characteristics of actions on a known critical action list.

If the determination at S415 is that the current action has been taken before, the method may proceed in a manner similar to those previously discussed. As illustrated in FIG. 9, a machine learning model based on historical incident data (including information on the action(s) matching the characteristics of the current action) may be used to determine a recommended action at S420. This determination may be made in response to a request received from the incident manager. The action recommendation may be sent to the incident manager at S425 and a response received back at S435. If the recommended action is implemented, the server may receive, at S440, action implementation information, which may then be used to establish a recommendation score for the recommendation at S445. Information received upon resolution of the action may include a resolution time stamp and information relating to the results of the action. Depending on the nature of the action, the resolution information may include changes in system state information. The recommendation score and/or the action implementation information may then be used to update the machine learning model at S450.

If a determination is made at S415 that the current action has not been taken before, the action may, at S460, be designated and tracked by the RFS as a hypothesis check. At S465, the server may receive (e.g., from the incident manager, a team member, or an automated system resource) hypothesis result information. The hypothesis result information can include initiation and resolution time stamps and information relating to the results of the action. Depending on the nature of the action, the resolution information may include changes in system state information resulting directly from the hypothesis check action. At S470, the machine learning model may be updated to include information on the new action or action type, including the details of the action taken and the results of the action.

Figure 10:
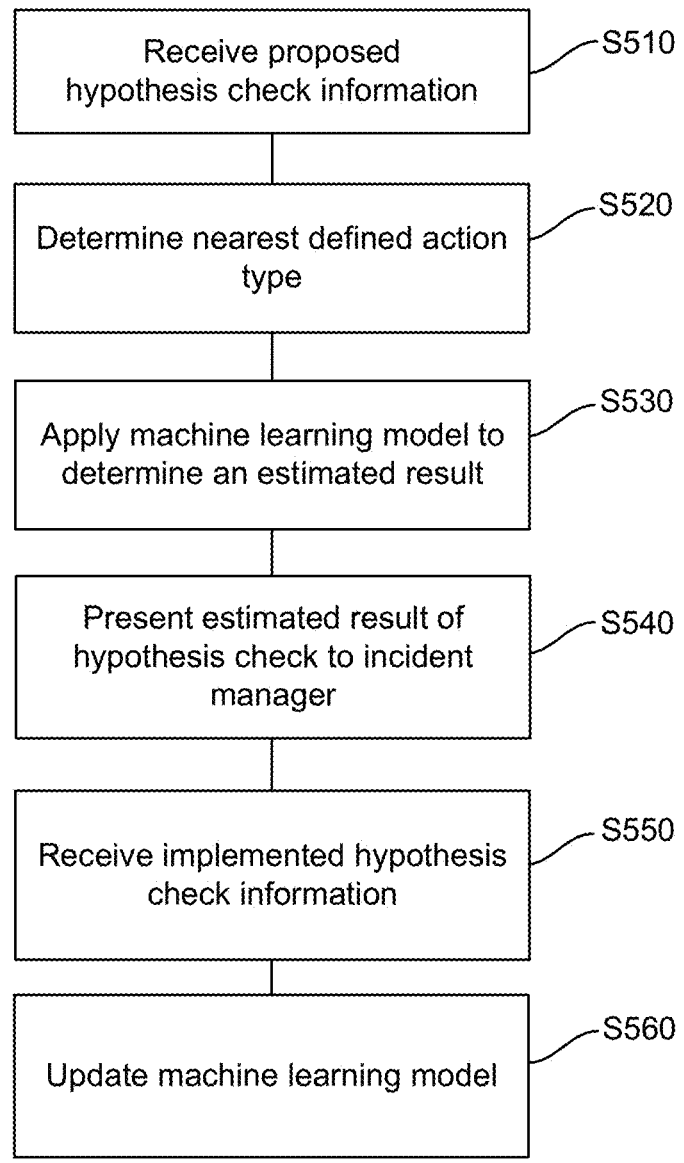
FIG. 10 is a flow chart of actions in a method of facilitating incident resolution according to an embodiment of the invention.

FIG. 10 illustrates a method M500 of facilitating resolution of an incident according to an embodiment of the invention. The method M500 provides a method for evaluating a proposed hypothesis check prior to its implementation. While the method M500 will be described in the context of system 100 of FIG. 1, it will be understood that the method M500 may be implemented on other incident resolution arrangements as well. The method M500 assumes that a facilitation resolution server has previously received incident information regarding an incident occurring on a target processing system. At S510 of method M500, a resolution facilitation server receives information on a proposed hypothesis check. In some cases, the proposed action may be identified as a hypothesis check in an evaluation request received from the incident manager. In other cases, the action may be determined by the resolution facilitation processor to be a hypothesis check through comparison to predefined actions or through comparison to actions in the incident resolution database. At S520, the server may determine a nearest previously conducted action or, alternatively, a nearest type of pre-defined action from a stored list of such actions. At S530, the identified nearest action is evaluated using a machine learning model based on historical incident resolution data and current incident information to produce an estimated hypothesis check result. A confidence level may also be determined based, at least in part, on how similar the hypothesis check action is to the nearest previously conducted action. The estimated hypothesis check result may be transmitted to the incident manager at S540. Information on the nearest previous action and the confidence level may be included with the estimated result.

The incident manager may use the estimated result information to determine whether to implement the hypothesis check. If the hypothesis check is implemented, the RFS may receive, at S550, information on the implemented hypothesis check. The hypothesis result information can include initiation and resolution time stamps and information relating to the results of the action. Depending on the nature of the action, the resolution information may include changes in system state information resulting directly from the hypothesis check action. At S560, the machine learning model may be updated to include information on the new action or action type, including the details of the action taken and the results of the action.

The systems and methods of the invention provide a tool that improves the efficiency of both automated and human resources in resolving major enterprise system incidents. This is accomplished by using an automated process to monitor system and resource status and to leverage historical data in identifying the actions most likely to be effective in resolving the technical issues causing the incident. Embodiments of the invention can be used to minimize the number of excess personnel involved and to focus incident managers on the right information and actions for resolution.

The present invention provides a method and system for authentication of symmetric encryption communications in which message authentication codes may be produced based on shared secret salt values that may be dynamically generated in parallel from a master key generated by a third party system. The result is more secure communication and construction of the shared data required for symmetric encryption communication.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An automated system for facilitating resolution of an incident occurring on a digital processing system, the automated system comprising:
   a data storage unit having stored therein a historical database of information on previous incidents;
   a user interface configured for presenting information to and receiving information from a user; and
   an automated resolution facilitation server configured to
      receive incident information from a monitoring system in communication with the digital processing system, the incident information including status information for at least one operating parameter of the digital processing system,
      apply a machine learning model to determine a first recommended action using the incident information and the previous incident information,
      present the first recommended action to the user via the user interface,
      receive a first recommendation response,
      establish a first recommendation score based at least in part on the first recommendation response, and
      update the machine learning model using at least one of the set consisting of the incident information, the first action recommendation, and the first recommendation score,
   wherein
      the automated resolution facilitation server is further configured to receive new action information about each of a plurality of actions taken in furtherance of resolving the incident, the new action information for each action including an action type, a time stamp, and a description of the action, and the new action information further including a result of a previous action;
      the previous action was taken in response to a previous action recommendation having an associated previous recommendation score;
      the automated resolution facilitation server is further configured to update the previous recommendation score based at least in part on the new action information, and
      the action to update the machine learning model also uses the updated previous recommendation score.

2. An automated system according to claim 1 wherein the automated resolution facilitation server is further configured to:
   upon receiving the new action information for a new action, applying the machine learning model to determine a new action recommendation based on the new action information;
   present the new action recommendation to the user;
   receive a new recommendation response from the user;
   establish a new action recommendation score for the new action recommendation based at least in part on the new recommendation response; and
   update the machine learning model using at least one of the set consisting of the new action information, the new action recommendation, and the new recommendation score.

3. An automated system according to claim 1 wherein the automated resolution facilitation server is configured so that the actions to apply a machine learning model to determine a first recommended action, present the first recommended action, receive a first recommendation response, establish a first recommendation score, and update the machine learning model, are taken in response to a recommendation request from the user.

4. An automated system according to claim 1 wherein the automated resolution facilitation server is configured so that the actions to apply a machine learning model to determine a first recommended action, present the first recommended action, receive a first recommendation response, establish a first recommendation score, and update the machine learning model, are taken in response to receiving at least one of the set consisting of additional incident information and action information.

5. An automated system according to claim 1 wherein the machine learning model is constructed based on the information on previous incidents in the historical database.

6. An automated system according to claim 1 wherein the automated resolution facilitation server is further configured to store all incident information and action information for an on-going incident in the historical database on the data storage unit.

7. An automated method of responding to an incident occurring on a digital processing system, the method comprising:
   receiving, by an incident resolution server, incident information for the incident;
   applying, by the incident resolution server, a machine learning model to determine a recommended action based on the incident information;
   transmitting the recommended action by the incident resolution server to a user data processing system for display to a user;
   receiving, by the incident resolution server, a recommendation response from the user data processing system;
   establishing, by the incident resolution server, a first recommendation score for the recommended action based at least in part on the recommendation response; and
   updating the machine learning model using at least one of the set consisting of the incident information, the recommended action, and the first recommendation score,
   wherein
      the method further comprises receiving, by the incident resolution server, new action information about each of a plurality of actions taken in furtherance of resolving the incident, the new action information for each action including an action type, a time stamp, and a description of the action, and the new action information further including a result of a previous action;
      the previous action was taken in response to a previous action recommendation having an associated previous recommendation score;
      the method further comprises updating, by the incident resolution server, the previous recommendation score based at least in part on the new action information; and
      the action to update the machine learning model also uses the updated previous recommendation score.

8. An automated method according to claim 7 wherein the first recommendation response includes an indication that the recommended action is accepted and wherein the method further comprises:
   receiving, by the incident resolution server, first recommended action information including identification of the recommended action and a recommended action initiation time stamp.

9. An automated method according to claim 7 further comprising:
receiving, by the incident resolution server, second recommended action information including identification of the recommended action, a recommended action resolution time stamp, and a recommended action result;
establishing, by the incident resolution server, a second recommendation score for the recommended action based at least in part on the recommendation action result; and
updating the machine learning model using at least one of the set consisting of the recommended action result and the second recommendation score.

10. An automated method according to claim 7 further comprising:
receiving, by the incident resolution server from the user data processing system, an action evaluation request including proposed action information about a proposed action for resolving the incident;
using the machine learning model, the incident information, and the proposed action information to determine an estimated result of the proposed action and a relative confidence level for the estimated result; and
transmitting, by the incident resolution server to the user data processing system, an action evaluation response including the estimated result of the proposed action and the relative confidence level.

11. An automated method according to claim 10 wherein the action evaluation response includes a recommendation to proceed with the proposed action or a recommendation not to proceed with the proposed action.

12. An automated method according to claim 7 further comprising:
receiving, by the incident resolution server, implemented proposed action information including proposed action initiation and resolution times and proposed action result information; and
updating the machine learning model using the implemented proposed action information.

13. An automated method according to claim 7 wherein the incident information includes status information for at least one operating parameter of the digital processing system, and
the action of receiving incident information is repeated to reflect changes in the status information.

14. An automated method according to claim 7 wherein at least a portion of the incident information is received from an automated monitoring system in communication with the automated processing system.

15. An automated method according to claim 7 wherein the actions of applying a machine learning model to determine a first action recommendation, presenting the first action recommendation, receiving a first recommendation response, establishing a first recommendation score, and updating the machine learning model, are taken in response to a recommendation request from the user.

16. An automated incident resolution system for facilitating resolution of an incident occurring on an automated processing system, the incident resolution system comprising:
an automated incident resolution server configured to
periodically receive incident information about the incident,
periodically receive action information about actions taken in furtherance of resolving the incident,
apply a machine learning model to determine recommended actions using the incident information, previous incident information, and the action information,
transmit the recommended actions over a network to a user processing system for display to a user,
receive recommendation responses from the user processing system over the network, and
update the machine learning model using at least one of the set consisting of the incident information, the action information, the recommend actions, and the recommendation responses,
wherein
the automated incident resolution server is configured to receive new action information about each of a plurality of actions taken in furtherance of resolving the incident, the new action information for each action including an action type, a time stamp, and a description of the action, and the new action information further including a result of a previous action;
the previous action was taken in response to a previous action recommendation having an associated previous recommendation score;
the automated incident resolution server is configured to update the previous recommendation score based at least in part on the new action information; and
the action to update the machine learning model also uses the updated previous recommendation score.

17. An automated incident resolution system according to claim 16 wherein the automated incident resolution server is further configured to present a proposed recommended action only if predetermined recommendation criteria are met.

18. An automated incident resolution system according to claim 17 wherein the automated incident resolution server is further configured to:
receive action evaluation requests including proposed action information about proposed actions for resolving the incident; and
for each proposed action,
use the machine learning model, the incident information, and the proposed action information to determine an estimated result of the proposed action and a relative confidence level for the estimated result, and
transmit to the user processing system an action evaluation response including the estimated result of the proposed action and the relative confidence level.

* * * * *